US011483594B2

United States Patent
Kalish (10) Patent No.: US 11,483,594 B2
(45) Date of Patent: Oct. 25, 2022

(54) SYSTEM AND METHOD FOR PARTIAL CACHING OF VIDEO BACKGROUND

(71) Applicant: Idomoo LTD, Hod Hasharon (IL)

(72) Inventor: Danny Kalish, Raanana (IL)

(73) Assignee: Idomoo LTD, Hod Hasharon (IL)

( * ) Notice: Subject to any disclaimer, the term of this patent is extended or adjusted under 35 U.S.C. 154(b) by 337 days.

(21) Appl. No.: 16/880,504

(22) Filed: May 21, 2020

(65) Prior Publication Data

US 2020/0374568 A1     Nov. 26, 2020

Related U.S. Application Data

(60) Provisional application No. 62/851,948, filed on May 23, 2019.

(51) Int. Cl.
| | |
|---|---|
| *H04N 21/231* | (2011.01) |
| *H04N 21/236* | (2011.01) |
| *H04N 21/262* | (2011.01) |
| *H04N 21/234* | (2011.01) |
| *H04N 21/24* | (2011.01) |
| *H04N 21/643* | (2011.01) |

(52) U.S. Cl.
CPC ..... *H04N 21/23106* (2013.01); *H04N 21/234* (2013.01); *H04N 21/236* (2013.01); *H04N 21/2407* (2013.01); *H04N 21/262* (2013.01); *H04N 21/643* (2013.01)

(58) Field of Classification Search
None
See application file for complete search history.

(56) References Cited

PUBLICATIONS

Goian et al., "Popularity-Based Video Caching Techniques for Cache-Enabled Networks: A Survey", IEEE Access, Mar. 4, 2019 (Year: 2019).*

* cited by examiner

*Primary Examiner* — James R Marandi
(74) *Attorney, Agent, or Firm* — Browdy and Neimark, P.L.L.C.

(57) ABSTRACT

The present invention, disclose a method for cashing video which is distributed through data communication network, implemented by one or more processors operatively coupled to a non-transitory computer readable storage device, on which are stored modules of instruction code that when executed cause the one or more processors to perform:
- generating Multi part single video file encoded in a single compression container, logically partitioned to multi parts;
- determining and maintaining expiration dates for each part of video, wherein the expiration date of at least two video parts is different;
- Caching video parts based on video partitions in at least one main original server and local memory;
- upon request for the multi part video, checking validation (expiration date) of each video part fetching or retrieving each video part from local or remote caching location based on expiration date of said video part;
- generating video stream composed of all retrieved validated video parts.

16 Claims, 10 Drawing Sheets

| 200 | Multipart Video player |

- receive multipart video file comprised of several parts/elements all encoded in single compression container/scheme, where each element has different expiry date. 210

- Uploading all video elements 220

- Option1
  - upon request for video, checking validation (expiration date) of each video part based on caching derivative in video meta data 230

- Option2
  - upon request for video, checking validation (expiration date) of each video part based attached/ /associated external file 240

- retrieving each video part from ,caching of edge server or original content caching of remote server or using local video element in user device based on validation/expiration date ; 250

- generating video stream composed of all cashed video parts. 260

Figure 2

200 | Personalized/ customized Video player retrieving user profile and context parameter ( e.g. weather)
210A Determining video elements ( composed of chunks of video frames , where each chunk can be replaced dynamically ) based personal and or customized video template
220A Option1
- upon request for customized video , checking validation (expiration date) of each video part based on caching derivative in video metadata
230A Option2
- upon request for video , checking validation (expiration date) of each video part based attached /associated external file
240A retrieving each video part from , edge sever or remote server caching location based on validation/expiration date ;
250A generating video stream composed of all cashed video parts.
260A

Figure 2A

300 | Video generator generating Multi part single video file encoded in a single compression container/scheme, where each part is associated with different validation data.
310

Optionally generating the multi part video by designing video template based on the templates predefined rules by defining video logic segment, defining dynamic parts of the segments
320

Optionally correlating logic segments with key frames, such that each logic segment is correlated with at least one key frame, wherein the key frame defines group of pictures/frames in compression scheme;
330 option 1 determining expiration date for each logic segmentation, wherein each key frame caching derivative include expiration date of the corresponding logic segment;
340

- option2 determining expiration date for each logic segmentation, by generating an attached/associated external file including association of the expiration date to each video element
350

Figure 3

| 400 | Main cache management Module |

Organizing video elements by the multipart video identity — 410

Caching video elements based on general usage statistics and load balancing algorithm or first in first out — 420

Option 1
upon request for video part, checking validation (expiration date) of each video part based on caching derivative incase the video part is valid transmitting video requested part to user player — 430

Option 2
upon request for video part, checking validation (expiration date) of each video part based on external file accompanied or associated to the multi part video incase the video part is valid transmitting video requested part to user player — 440

Figure 4

300 | Edge cache management Module

Applying cache management of video elements based on general usage statistics and load balancing algorithm or first in first out
510

Option 1                                                                                    520
          upon request for video part, checking validation (expiration date) of each video part based on caching derivative Option 2
          upon request for video part, checking validation (expiration date) of each video part based on external file associated to the movie and fetching or retrieving each video part from local or remote caching location based on validation/expiration date ;
~.
530

Figure 5

| 38 | Video stream player |

Receiving user stream request for multipart video at designated web server such HHTP.
610

Optionally Retrieving personal video template or personalized video format with static video elements and dynamic video elements which are determined based on personalization and context rules
620 upon receiving stream request for video , checking validation (expiration date) of each video part saved in the header in the communication protocol (e.g. http protocol) and fetching or retrieving each video part from local memory , edge sever or remote server caching location based on validation/expiration date
630 generating video stream composed of all cashed video parts.
640

Figure 6

700 | Multipart Video updating

- receive multipart video file comprised of several parts/elements all encoded in single compression scheme /container , where each element has different expiry date. 710

- Checking validation of each video 720

- Option1
  - checking validation (expiration date) of each video part based on caching derivative 730

- Option2
  - checking validation (expiration date) of each video part based attached/associated external file 740

- retrieving each video part from , edge sever , remote server caching location or local caching at the client device based on validation/expiration date ; 750

- Updating video stream composed of all cashed video parts sending . 760

Figure 7

SYSTEM AND METHOD FOR PARTIAL CACHING OF VIDEO BACKGROUND

BACKGROUND

Technical Field

The present invention relates generally to the field of caching. A personalized video can consists of static parts, which all users see, and dynamic parts, which are customized for each user. This means that the caches can be separated between the static components and the dynamic components.

Discussion of Related Art

Caches are used to speed up the transmission of large amounts of data from servers to users. In a system of partial-caching, only some of the data that is the same for all video users is cached, and customized, user-specific data is not cached and is sent separately.

When a network user visits a URL with cacheable content, Edge Cache first determines if the content is available in its cache. If not, Edge Cache retrieves the content from the URL. Upon retrieving the content from source website. It is stored in the cache with its expiry date as specified on the source website. This assumes that the content is cacheable and falls within the Edge Cache setting parameters, such as size of object and whether or not the URL is blacklisted. The next time a network user visits the same URL, Edge Cache determines that the content is available in the cache and that the content is not stale by looking at the object expiry date. The content is then served to the client from the cache, rather than retrieving from the URL over the WAN.

Edge Cache uses a least recently used (LRU) algorithm for expiring cached data to make room for new objects. This means the most popular and most used content is stored the longest. You also have the ability to manually clear the entire cache if desired.

Edge Cache operates as a transparent proxy since it is running on an inline device. As a result, your browsers do not need to be configured with an explicit proxy configuration.

In prior art there are known play lists of videos with known format of such as MP4, each video is a separate file, compressed separately.

BRIEF SUMMARY

The present invention, disclose a method for cashing video which is distributed through data communication network, implemented by one or more processors operatively coupled to a non-transitory computer readable storage device, on which are stored modules of instruction code that when executed cause the one or more processors to perform:
  generating Multi part single video file encoded in a single compression container, logically partitioned to multi parts;
  determining and maintaining expiration dates for each part of video, wherein the expiration date of at least two video parts is different;
  Caching video parts based on video partitions in at least one main original server and local memory;
  upon request for the multi part video, checking validation (expiration date) of each video part fetching or retrieving each video part from local or remote caching location based on expiration date of said video part;
  generating video stream composed of all retrieved validated video parts.

According to some embodiment of the present invention, at least two parts of a single multi part video have different caching derivative with different validation information; further comprising the step of correlating logic segments with key frames, such that each logic segment is correlated with at least one key frame, wherein the key frame defines group of frames in compression scheme; According to some embodiment of the present invention, the expiration dates for of video parts, are maintained on an external file associated to the multipart video.

According to some embodiment of the present invention, the expiration dates are maintained in a header of a streaming communication protocol of said multipart video.

According to some embodiment of the present invention, the caching module schedule updating the cached elements using push delivery at edge server or at the client side.

According to some embodiment of the present invention the multipart video is personalized real time generate video stream further comprising the steps of:
  generating video template comprising static elements and dynamic elements configured to be generated in real time based on personal or customized data received in real time;
  Generating personal video based on video template including cache static video elements and dynamic video context elements and generating personalized elements which are unavailable in cache memory or retrieving elements which are available in cache memory of an original server or edge sever.

According to some embodiment of the present invention, the caching static and dynamic video elements based on usage statistics.

The present invention disclose a system for cashing video which is distributed through data communication network, implemented by one or more processors operatively coupled to a non-transitory computer readable storage device, on which are stored modules of instruction code, said modules comprised of:
  video generator module implemented on an original server configured for generating Multi part single video file encoded in a single compression container, logically partitioned to multi parts and determining and maintaining expiration dates for each part of video, wherein the expiration date of at least two video parts is different;
  Cashing management module configured for Caching video parts based on video partitions in at least one main original server,
  player module implemented on a client device configured for checking validation (expiration date) of each video part and fetching or retrieving each video part from local or remote caching location based on validation/expiration date and generating video stream composed of all retrieved validated video parts According to some embodiment of the present invention, at least one video two parts have a different caching derivative with different validation information wherein generation module further configured for correlating logic segments with key frames, such that each logic segment is correlated with at least one key frame, wherein the key frame defines group of frames in compression scheme;

According to some embodiment of the present invention, the expiration dates for of video parts, are maintained on an external file associated to the multipart video.

According to some embodiment of the present invention, the expiration dates are maintained in a header of the streaming communication protocol of said multipart.

According to some embodiment of the present invention, the multipart video is personalized real time generate video, wherein the video generator module generates a video template comprising static elements and dynamic elements configured to be generated in real time based on personal or customized data received in real time, wherein the player module generates personal video based on video template including cache static video elements and dynamic video context elements and generating personalized elements which are unavailable in cache memory or retrieving elements which are available in cache memory of an original server or edge sever.

According to some embodiment of the present invention, the caching static and dynamic video elements based on usage statistics.

According to some embodiment of the present invention, cache management module is implemented on the main original server.

According to some embodiment of the present invention, the cache management module is implemented on the client device.

According to some embodiment of the present invention, the cache management module is implemented on an edge server.

BRIEF DESCRIPTION OF THE SCHEMATICS

The present invention will be more readily understood from the detailed description of embodiments thereof made in conjunction with the accompanying drawings of which.

DETAILED DESCRIPTION OF THE VARIOUS MODULES SCHEMATICS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention provides a solution for caching multi part video files comprised of different elements, each part can updated and changed separately and has different expiry date. Optionally the combined video files are personal or customized video files. Today when a user request content of video file through edge server delivery systems, the whole video has an expiry date, based on the expiry date the edge server manages the caching (deleting objects). The expiry date is determined by the source website. For Personal or customized video files the content web source may define different expiry date for each part of the video, as parts of the video has to be update in different frequency then other parts, hence enabling more efficient video delivery and caching, in case only parts of the video is to be updated.

The Multi part video file is single video file having encoded in single container format in a single compression scheme requested from a single HTTP request in a single container providing continuous playing session, logically partitioned to multi elements, wherein at least one element has a different caching derivative with different validation information (from main caching derivative)

Each element is a chunk including one or more frames, each frame can combination of frames parts where each frame part has different caching derivative The New video format as suggested by the present invention may be for example enhancing of MP4 format to include multiple caching derivatives.

The second solution suggested by the present invention is of external file to be used regular MP4 format associated by common ID, implemented by the player at the client or at the browser level or at the operating system.

Figure 1:
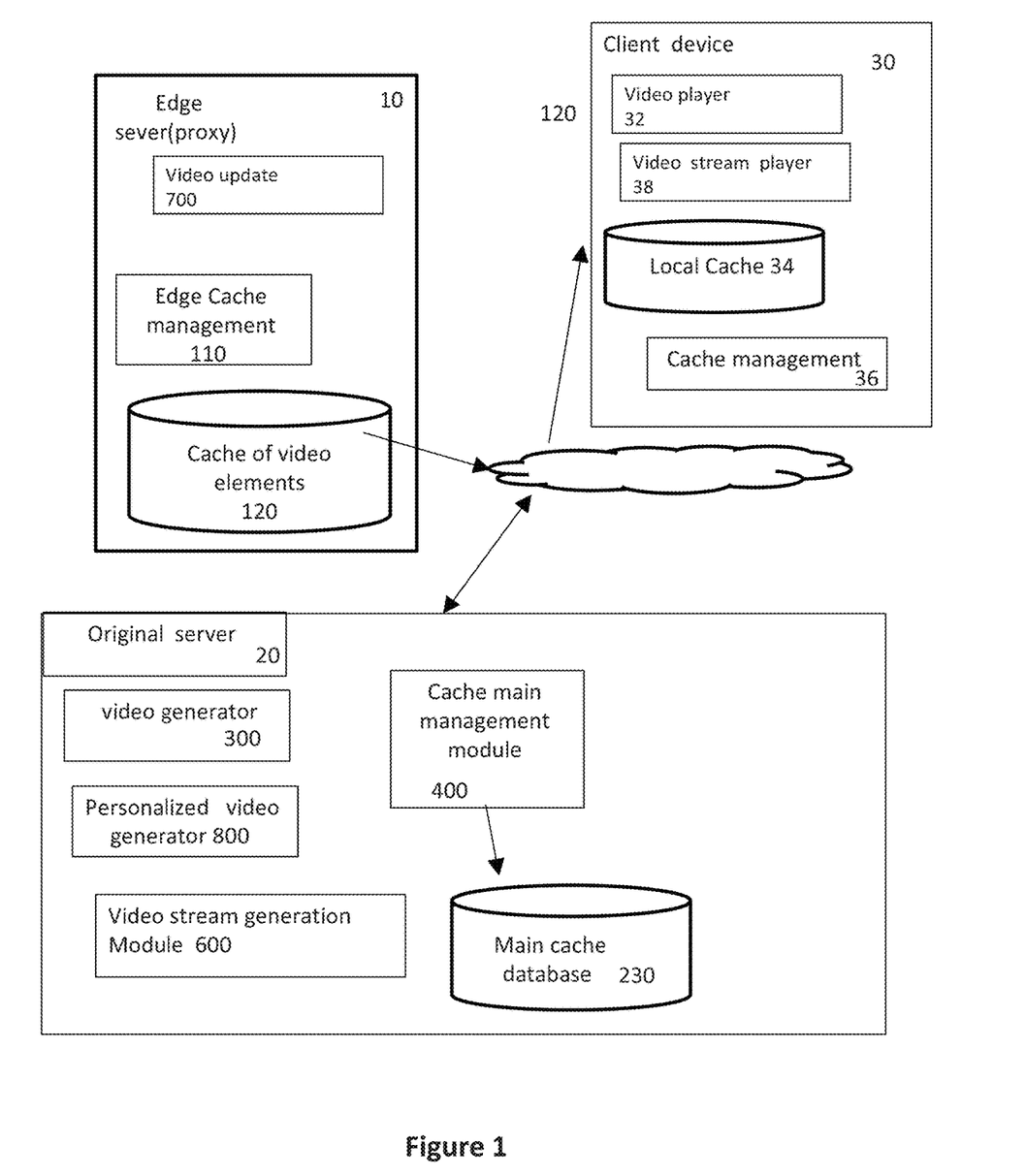
FIG. 1 is a block diagram of content delivery caching system, according to some embodiment's of the present invention.

Optionally according to some embodiments of the present invention each frame part has a different validation, expiration date FIG. 1 is a block diagram of content delivery caching system, according to some embodiment's of the present invention.

The content delivery systems is comprised of edge server 10, client device 30 and original main server 20.

The edge server 10 comprise Cache of video elements 120, optionally video update module 800 and Cache Management 110, which manages the multipart video elements based on validation data and cache of video elements.

The main server 20 comprises a main cache database 230 in which are stored the original multipart videos, cache main management module 400, multipart video generator 300. The main server optionally consists of the statistical analysis module enabling analyzing video elements usage statistics per region or server. Optionally the main server further comprise a personalized video generator 800 which uses profile data and context of video and environmental data such as the weather, to generate a custom personalized video for a user. The statistical analysis of the video usage further analyzes a users' viewing behavior an interaction with video in relation to different parts of the video. The main cache database 230 holds all elements of the multi parts video, optionally the video parts may be categorized to the static elements that are the same for all users and dynamic parts which are personalized or customized. Part of the cached video elements are stored on temporary caches located in user device 30.

According to some embodiment of the present invention, the main original server further comprises a video stream generator 600 for generating multipart video stream by configuring the header of the video stream communication platform to include the validation of expiration date for each part of the video. At least two parts may have different expiration dates.

The client/user device (such as personal computer or a smart phone) comprises local cache memory, optionally cache management 36 and a video player 32 which manages the process of playing all video parts, which are partly cached on the user device. Before playing the video, the player checks the expiration date of each part of the video, incase at least one video part has expired, the player retrieves the expired part from the edge server or main server. The edge server, checks the expiration date of the equivalent cached video part, saved at the edge sever. Incase cached element at the edge server has not expired, it is transmitted to the user device, otherwise it retrieved from the main original server. Optionally the client device comprise stream player module 600 for managing the streaming video play process.

Optionally according to some embodiments of the present invention, the caching module schedule updating the cached elements using push delivery at edge server or at the client side.

Figure 1A:
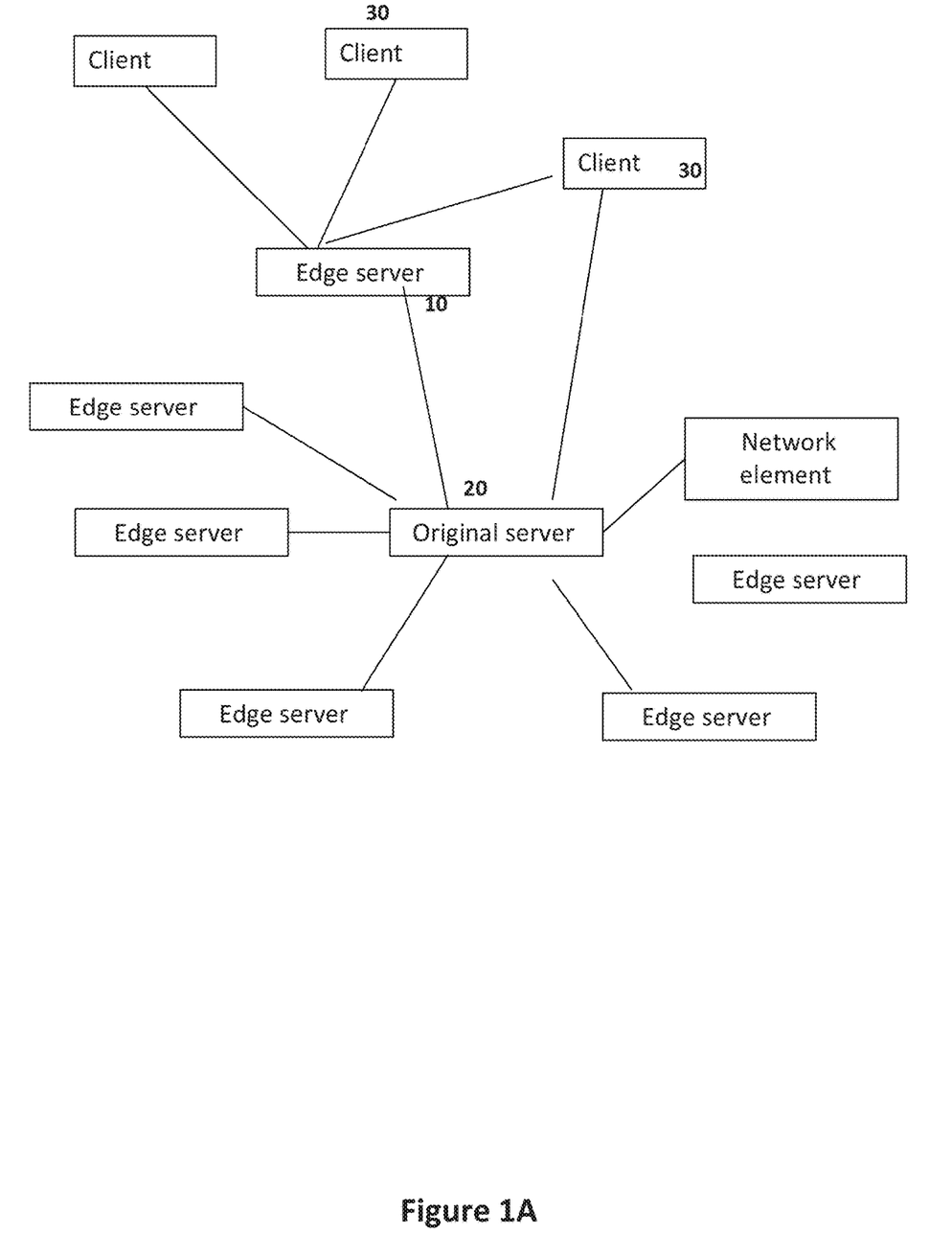
FIG. 1A is a diagram of the Server caching distribution network, according to some embodiments of the present invention.

FIG. 1A is a diagram of the server caching distribution network. The Main Server 20 generate multi part video files comprised of multiple parts, the video may be personalized or customized video, the video elements are cached and distributed to the Edge servers 10, which cache the video element based on expiry date of each element and or based load balancing algorithm by analyzing usage statistics of the video elements. Upon user device 30 request for specific multi part video, are identified all required video elements, checking the availability of each video element, first at the edge server 10 and finally at the main server, the available cached video elements which are up to date, are transmitted from edges severs, the main servers upon a client request to start playing the video.

Figure 2:
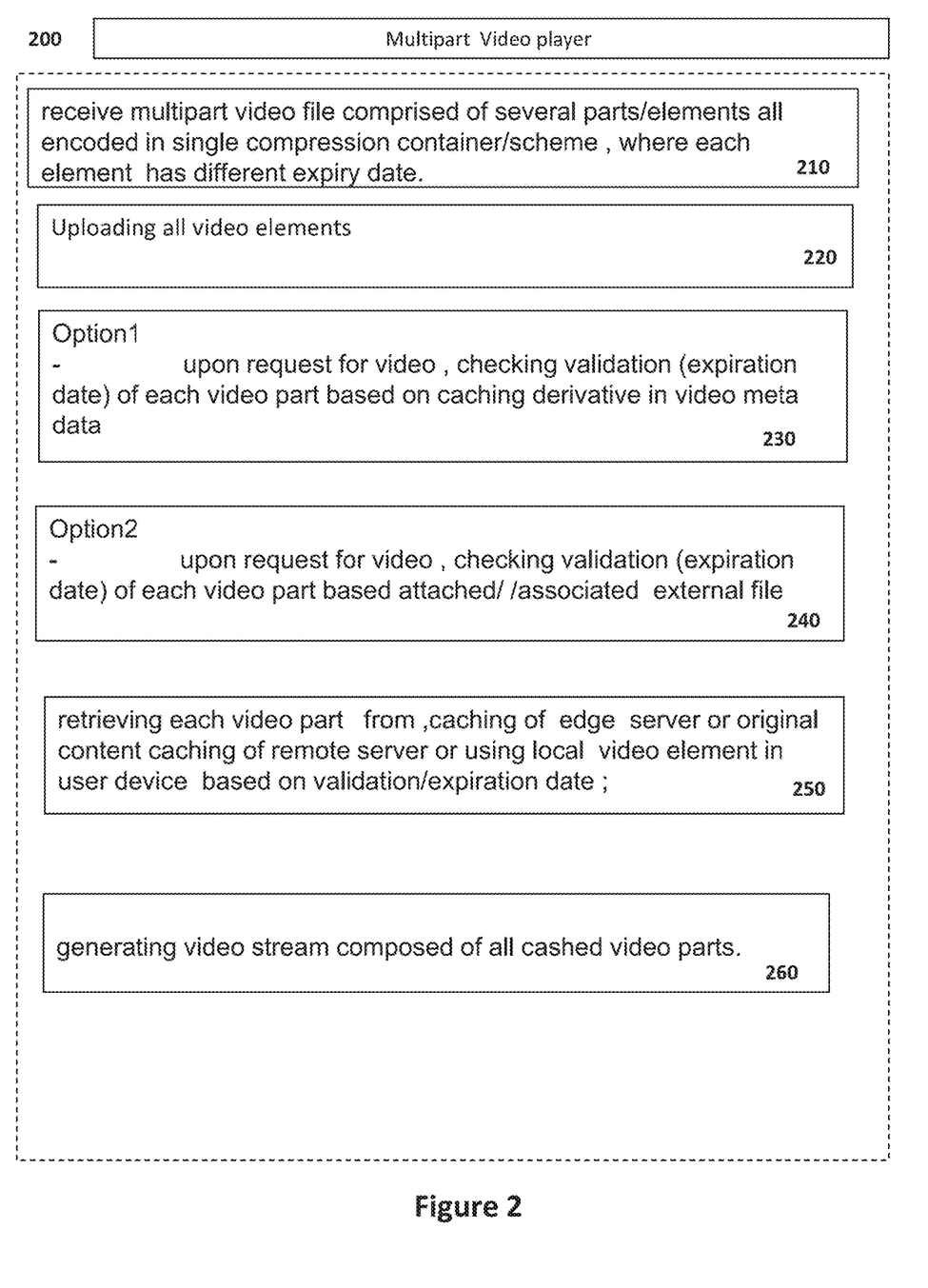
FIG. 2 is a flow diagram of the designated multi part Video player, according to some embodiments of the present invention.

FIG. 2 is a flow diagram of the designated multi part Video player. This player is designed and programmed to play or stream video file, which is comprised of multiple video elements. The processing of this video player comprises the following steps:

The player receives multi part video file comprised of several elements, where each element has different expiry date. (210);

The user device uploads all video elements (220), at the first time the video may be uploaded all parts from the main original server, at later periods of playing the video part of the video may be cached at local device cache or at an edge server.

The player checks the expiration date of each video element, based on one of the following options:

Option 1, upon request for video, checking validation (expiration date) of each video part based on caching derivative at the key frame of each video part. (230)

Option 2, upon request for video, checking validation (expiration date) of each video part based on associated external file, where the associated video file include list of expiration dates, corresponding to the different video elements. (240). The associated filed may be cached with the video file or in a different database.

Retrieving the required video elements from the edge server or remote server caching location based on validation/expiration date. (250)

At the last stage is generated multi part video composed of all cashed video elements. (260)

Figure 2A:
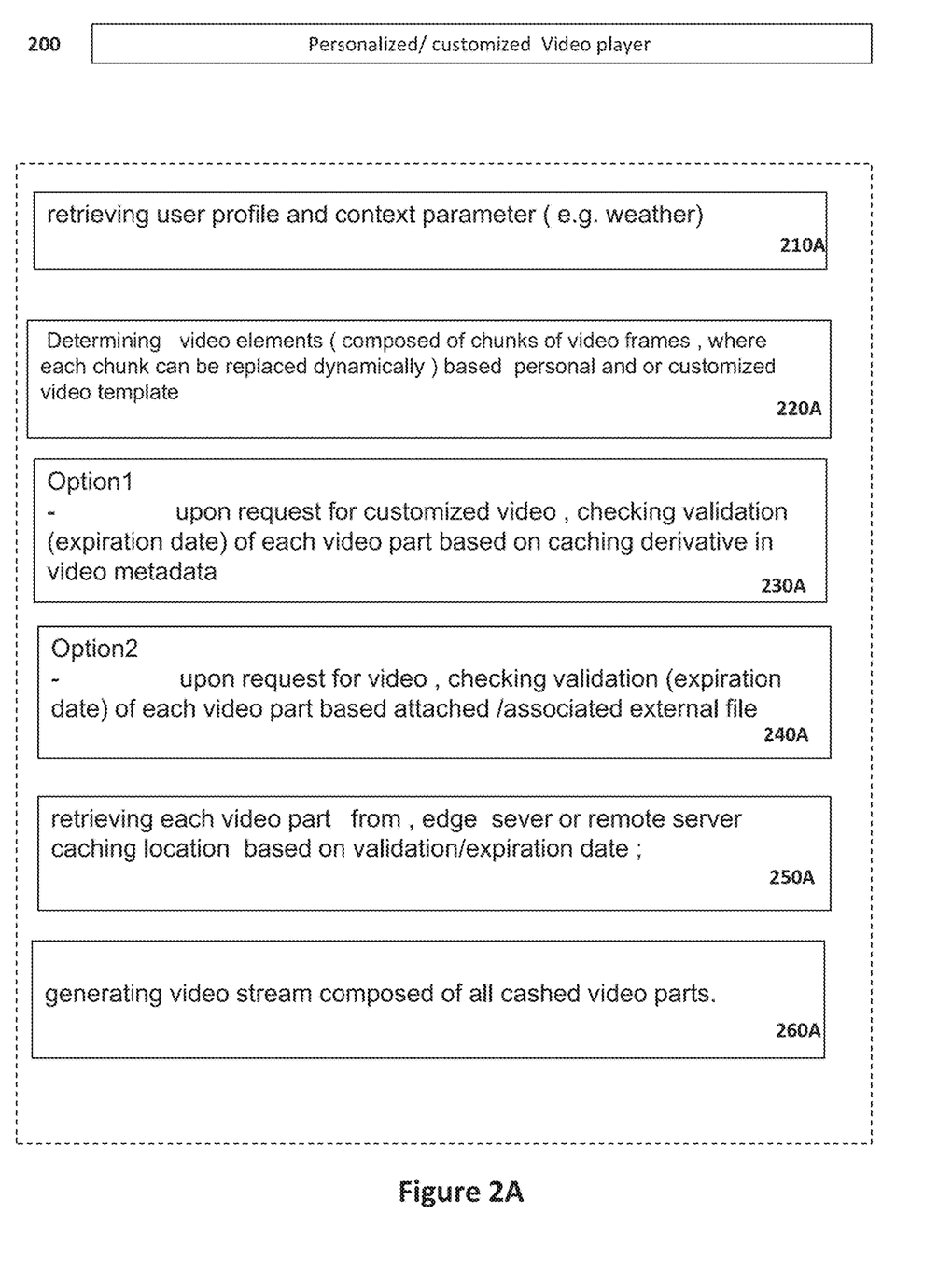
FIG. 2A is a flow diagram of the designated personalized/customized Video player. this player is designed and programmed to play/stream, according to some embodiments of the present invention.

FIG. 2A is a flow diagram of the designated personalized/customized Video player according to some embodiments of the present invention.

The processing of the personalized/customized video player comprises the following steps:

Optionally, retrieving user profile and context parameter (e.g. location, weather) (210A)

The personal video player may generate the video, based on template video format which has predefined rules for customizing and/or personalizing video elements based on user profile and/or context parameters. (220A)

Optionally the video elements are categorized to static video elements and dynamic video elements which are determined based on personalization and context rules;

Determining video elements (composed of chunks of video frames, where each chunk can be replaced dynamically) based personal and or customized video template (230A).

The player checks the expiration date of each video element, based on one of the following options:

Option 1, upon request for video, checking validation (expiration date) of each video part based on caching derivative at the key frame. (230A)

Option 2, upon request for video, checking validation (expiration date) of each video part based attached/associated external file, where the attached video file include list of expiration dates, corresponding to the different video elements. (240A)

Retrieving the required video elements from the edge server or remote server caching location based on validation/expiration date. (250A)

At the last stage is generated combined video composed of all cashed video parts. (260A)

Figure 3:
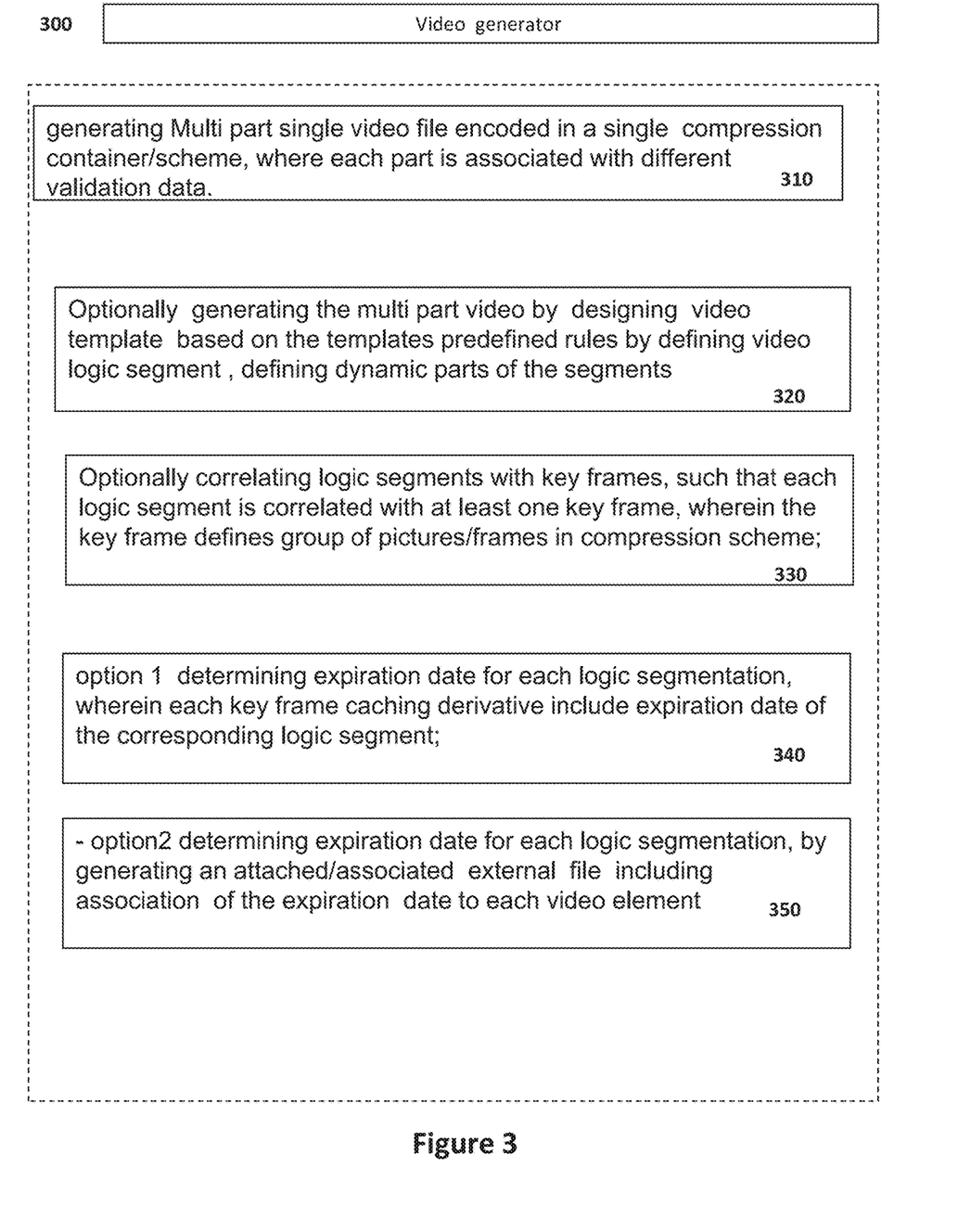
FIG. 3 is a diagram of the video generator video Module, according to some embodiments of the present invention.

FIG. 3 is a diagram of the video generator video Module, according to some embodiments of the present invention.

The process of generating the multipart video including at least one of the following steps:

generating Multi part single video file encoded in a single compression container/scheme where each part is associated with different validation data (310).

Optionally according to other embodiments of the present invention designing video template based on the templates predefined rules by defining video logic segment, defining dynamic parts of the segments (320).

Optionally, for each logic video segment, are defined dynamic or static parts of the segments.

Optionally according to other embodiments of the present invention correlating logic segments with key frames, such that each logic segment is correlated with at least one key frame, wherein the key frame defines group of pictures/frames in compression scheme (330);

The expiration date of each video part may determined by two optional methods:

Option 1 determining expiration date for each logic segment, wherein each key frame caching derivative includes expiration date of the corresponding logic segment (340).

Option 2 optionally according to some embodiments of the present invention, are generated external files associated/attached to the video with list of expiration dates for each segment (350).

Figure 4:
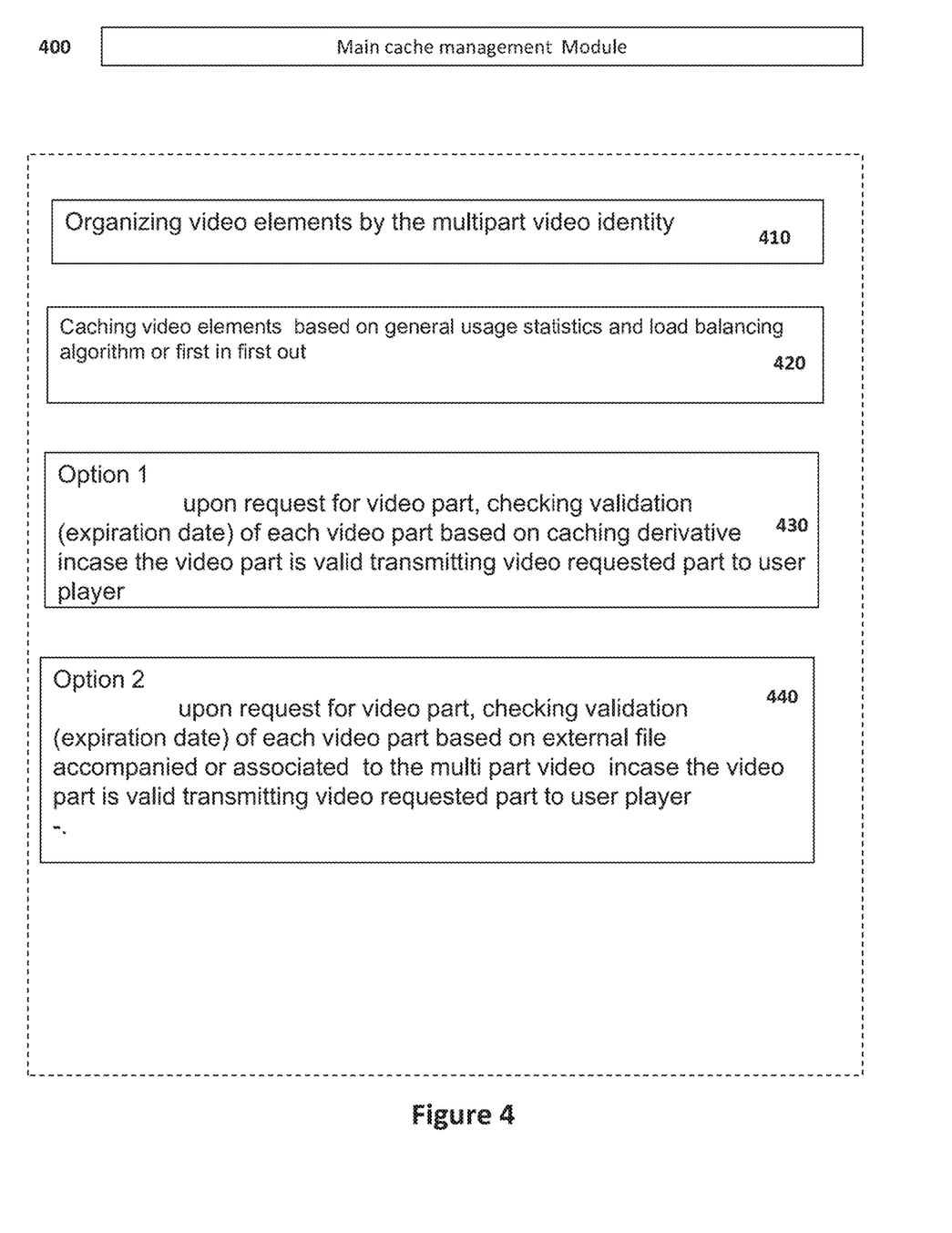
FIG. 4 is a diagram of the Main Cache Management Module, according to some embodiments of the present invention.

FIG. 4 is a diagram of the Main Cache Management Module according to other embodiments of the present invention.

The process Cache Management comprises at least one of the followings steps:

Optionally, Organizing video elements by the multipart video identity (step 410);

Applying cache management of video elements based on general usage statistics and load balancing algorithm or first in first out (420);

Managing the cache retrieval according to one of the following options:

Option 1 a. upon request for video part, checking validation (expiration date) of each video part based on caching derivative, in case the video part is valid transmitting video requested part to user player (430).

Option 2 b. upon request for video part, checking validation (expiration date) of each video part based on external file accompanied or associated to the multi part video incase the video part is valid transmitting video requested part to user player (440).

Figure 5:
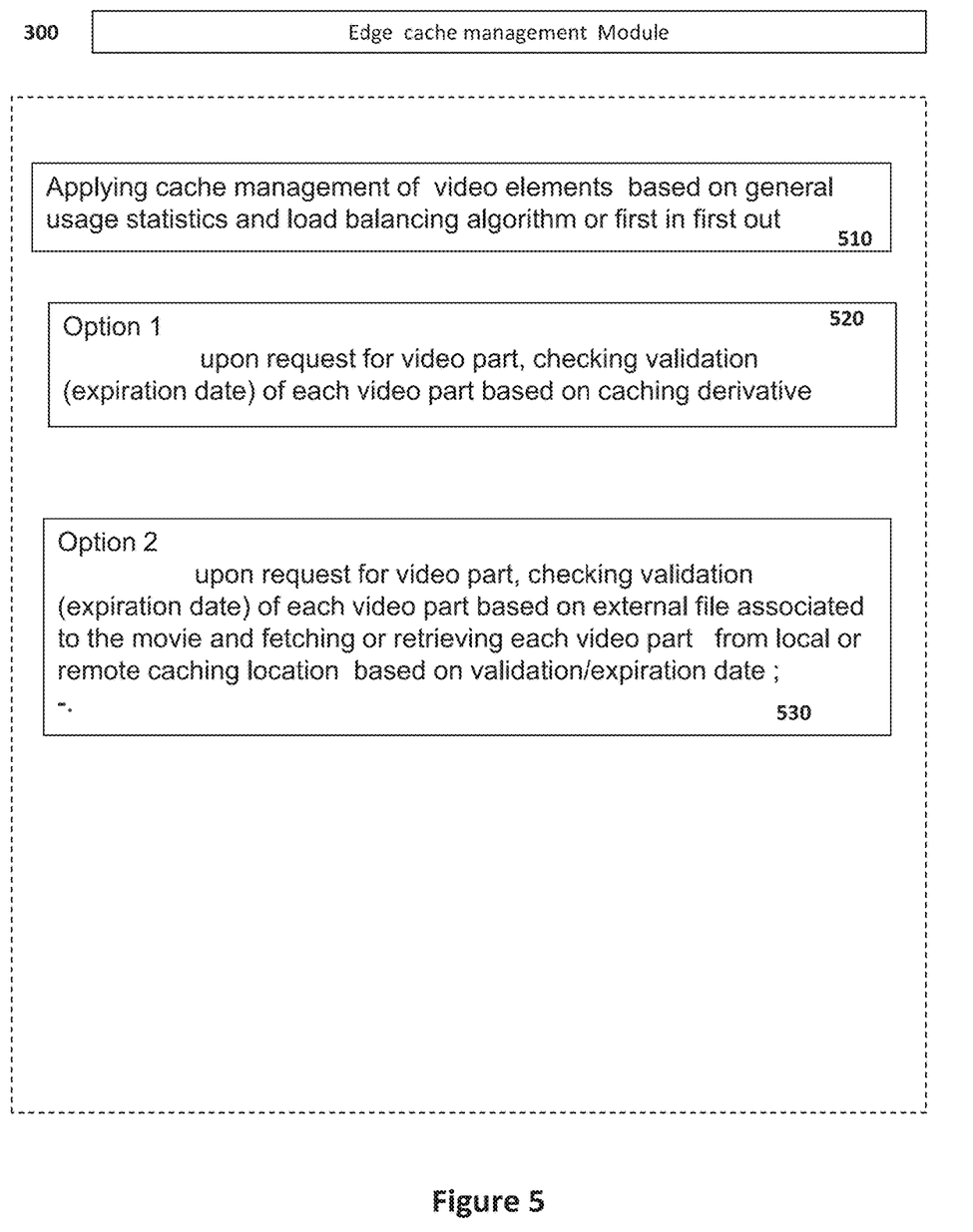
FIG. 5 is a diagram of the Edge Cache Management Module, according to some embodiments of the present invention.

FIG. 5 is a diagram of the Edge Cache Management Module according to other embodiments of the present invention.

The cache management may be operated according to one of the following options:

Applying cache management of video elements based on general usage statistics and load balancing algorithm or first in first out (step 510);

For example, a user may see a clip of the news, followed by a clip of the local sports news that are tailored to his or her geographic location.

The cache management retrieval can processed according to one of the following options:

Option 1: upon request for video part, checking validation (expiration date) of each video part based on caching derivative, in case the video part is valid transmitting video requested part to user player (520).

Figure 6:
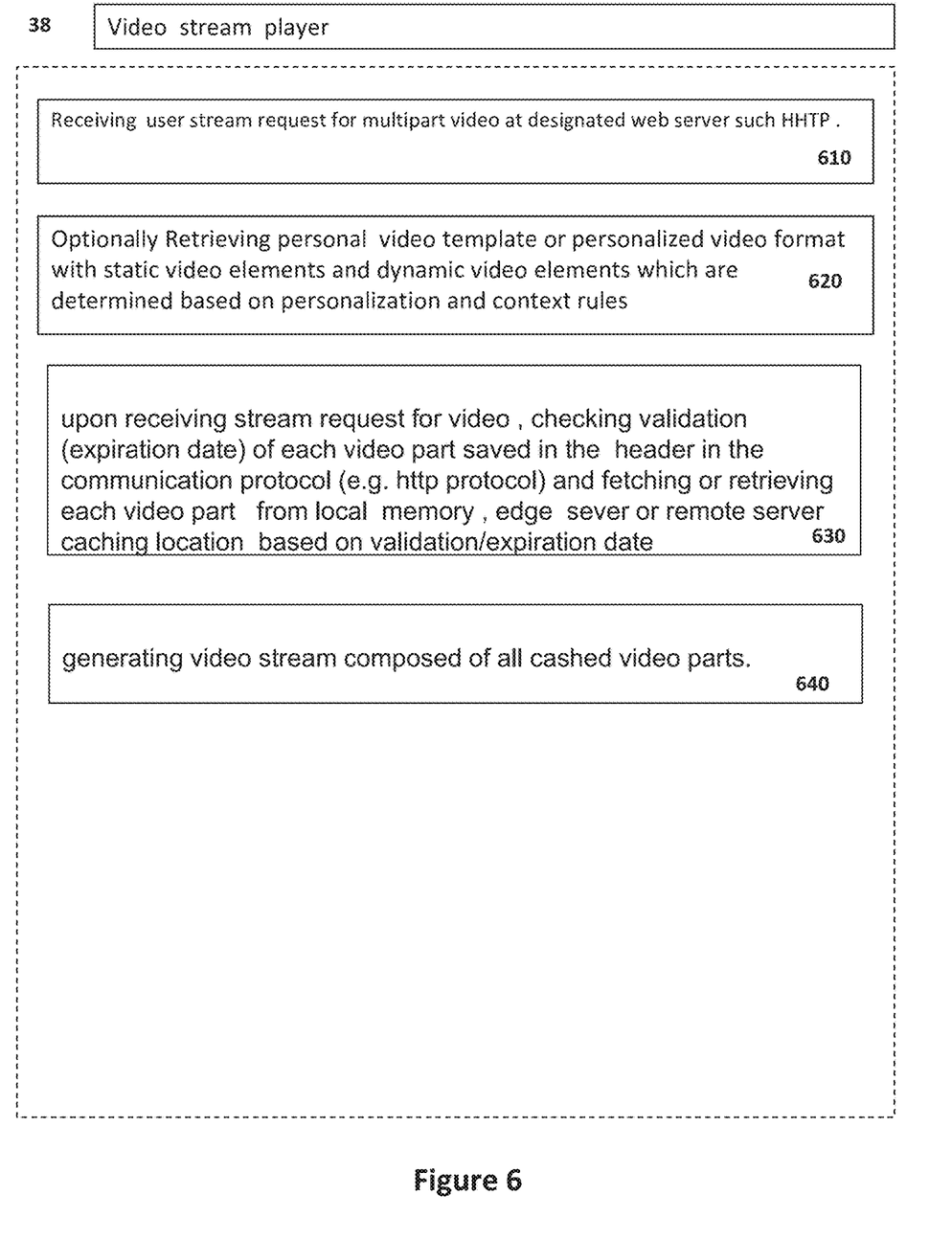
FIG. 6 is a flow diagram of the Video Stream Management Module, according to some embodiments of the present invention.

Option 2: upon request for video part, checking validation (expiration date) of each video part based on external file associated to the movie in case the video part is valid transmitting video requested part to user player (530);

FIG. 6 is a flow diagram of the Video Stream Management Module according to other embodiments of the present invention.

According to some embodiments of the present invention, the multi part video is provided at as video stream at a designated communication node, such as web page. At the first time the user request the video stream, the multipart video is streamed form from the original server, where all the parts are validated. When or after streaming the multipart video, the video parts can be cached in the edge server, or at the client device. When the user request to play the video at a second time, the user player stream module, check the local cache for cache elements, checking their validation based on the expirations dates at the header of the communication protocol, such as HTTP header. The header of the communication protocol for the validation data of each video part. The header is configured when preparing the multipart video streaming.

The process of Video Stream Management comprises the following steps:

Receiving user stream request for multipart video at designated web server such HHTP request (step 610);

Optionally Retrieving personal video template or personalized video format with static video elements and dynamic video elements which are determined based on personalization and context rules (step 620);

Upon receiving stream request for video, checking validation (expiration date) of each video part saved in the header in the communication protocol (e.g. http protocol) and fetching or retrieving each video part from local memory, edge server or remote server caching location based on validation/expiration date (step 630).

At the end of the process generating video stream composed of all cashed video parts (step 640).

Figure 7:
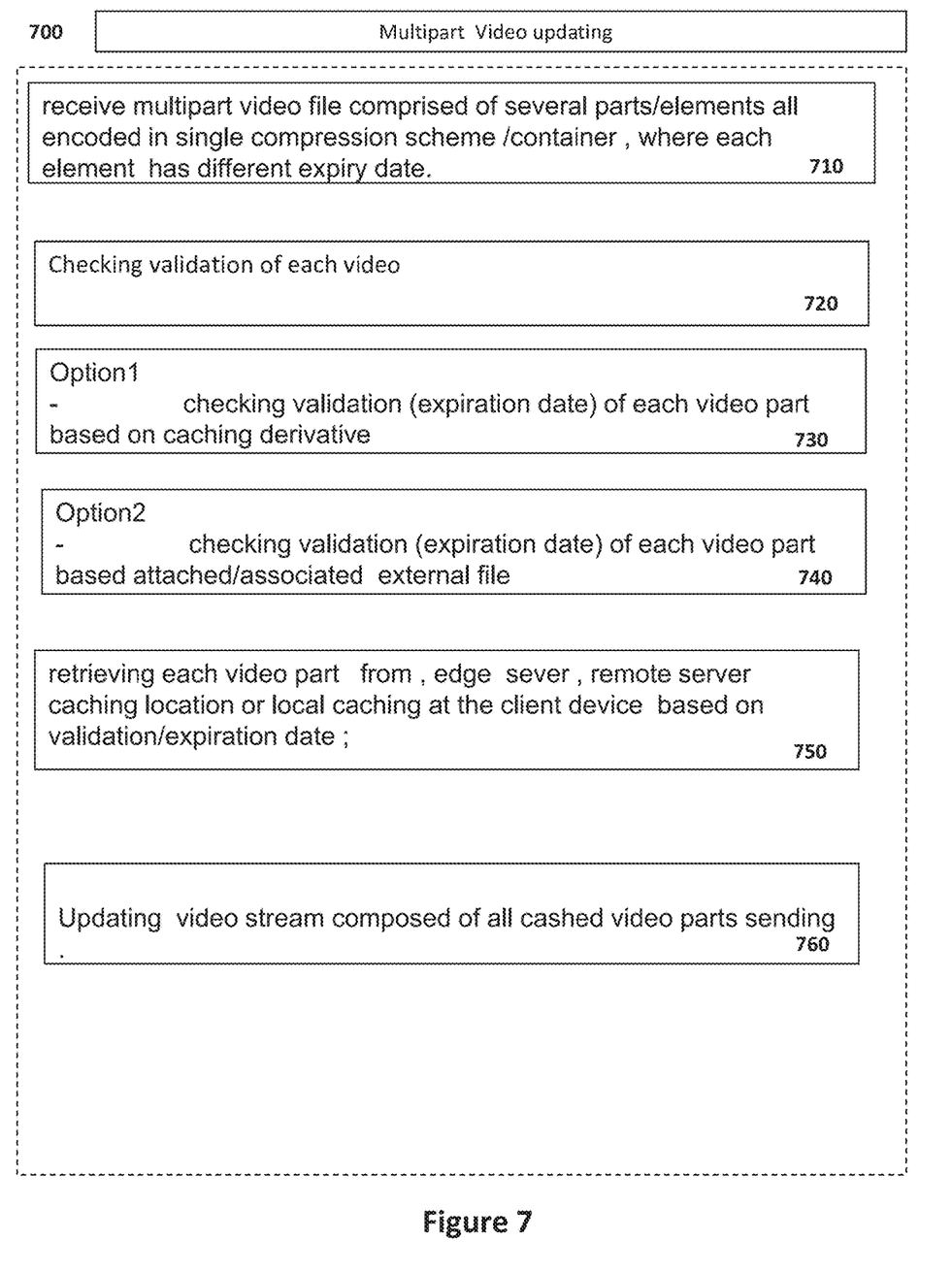
FIG. 7 is a flow diagram of, Multipart Video updating module, according to some embodiments of the present invention.

FIG. 7 is a flow diagram of Multipart Video updating module, according to some embodiments of the present invention.

The Multipart Video updating process comprises at least one of the following steps:

receive multipart video file comprised of several parts/elements all encoded in single compression scheme/container, where each element has different validation data of expiry date (710).

Checking validation of each video (720) by applying one of the following methods:

Option 1 checking validation (expiration date) of each video part based on caching derivative (730).

Option 2 checking validation (expiration date) of each video part based associated external file (740).

retrieving each video part from, edge server or remote server caching location based on validation/expiration date; (750)

Figure 8A:
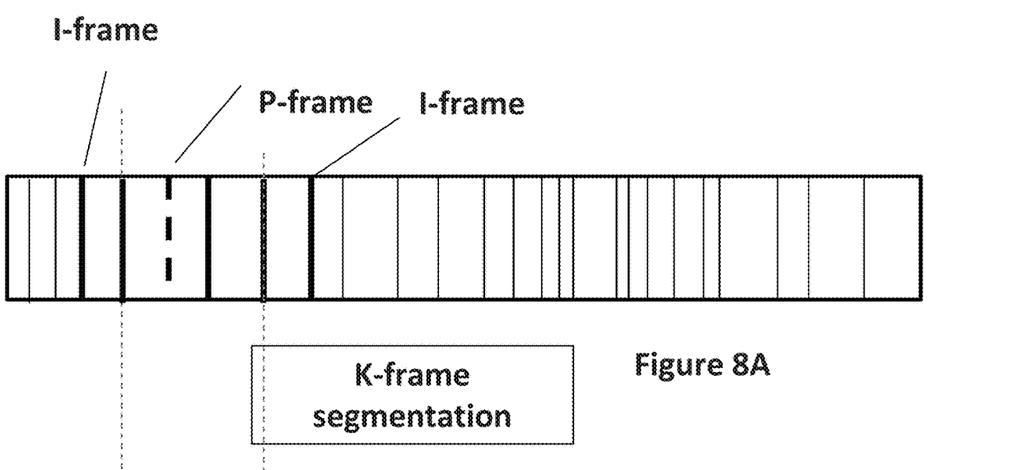
FIG. 8A, 8B is an example of the video frame partition according to some embodiments of the present invention.
Figure 8B:
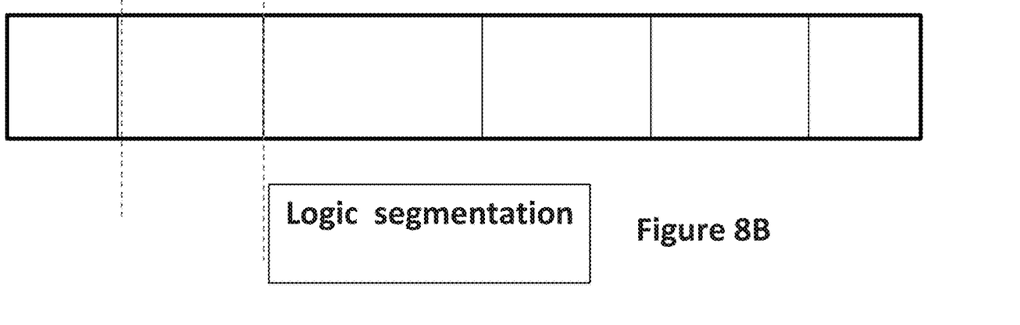

FIGS. 8A and 8B are example of the video frame partition according to some embodiments of the present invention.

FIG. 8*a* is an example of video framing partition of a compression scheme, such as MPEG, where each P frame include full frame information and in between I frames include only changes between sequential frames. FIG. 8*b* is an example of logical frame partition. Each group of frames represents video segments. For example, in video news, each video segment represents a news item. There is a synchronization between the two types of partition. Each logic segment includes/associated with at least one P-frame partition segment. Every logic segment is assigned an expiration date. The P-frames inherit the expiration date of the corresponding logic segment.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order, program storage devices readable by machine, tangibly embodying a program of instructions executable by the machine to perform any or all of the steps of any of the methods shown and described herein, in any suitable order, a computer program product comprising a computer useable medium having computer readable program code, such as executable code, having embodied therein, and/or including computer readable program code for performing, any or all of the steps of any of the methods shown and described herein, in any suitable order, any technical effects brought about by any or all of the steps of any of the methods shown and described herein, when performed in any suitable order any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order, a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for cashing video which is distributed through data communication network, implemented by one or more processors operatively coupled to a non-transitory computer readable storage device, on which are stored modules of instruction code that when executed cause the one or more processors to perform:
    generating Multi part single video file encoded in a single compression container, logically partitioned to multi parts;
    determining and maintaining validation data of expiration dates for each part of video, wherein the expiration date of at least two video parts is different;
    caching video parts based on video partitions in at least one main original server and local memory;
    upon request for the multi part video, checking validation of expiration date of each video part retrieving each video part from local or remote caching location based on expiration date of said video part;
    generating video stream composed of all retrieved validated video parts.

2. The method of claim 1 wherein at least two parts of a single multi part video have different caching derivative with different validation information; further comprising the step of correlating logic segments with key frames, such that each logic segment is correlated with at least one key frame, wherein the key frame defines group of frames in the compression scheme.

3. The method of claim 1 wherein the expiration dates for of video parts, are maintained on an external file associated to the multipart video.

4. The method of claim 1 wherein the expiration dates are maintained in a header of a streaming communication protocol of said multipart video.

5. The method of claim 1 wherein the caching module schedule updating the cached elements using push delivery at edge server or at the client side.

6. The method of claim 1 wherein the multipart video is personalized real time generate video stream further comprising the steps of:
generating video template comprising static elements and dynamic elements configured to be generated in real time based on personal or customized data received in real time;
generating personal video based on video template including cache static video elements and dynamic video context elements and generating personalized elements which are unavailable in cache memory or retrieving elements which are available in cache memory of an original server or edge server.

7. The method of claim 6 wherein the caching static and dynamic video elements is based on usage statistics.

8. A system for cashing video which is distributed through data communication network, implemented by one or more processors operatively coupled to a non-transitory computer readable storage device, on which are stored modules of instruction code, said modules comprised of:
video generator module implemented on an original server configured for generating Multi part single video file encoded in a single compression container, logically partitioned to multi parts and determining and maintaining validation data of expiration dates for each part of video, wherein the expiration date of at least two video parts is different;
Cashing management module configured for Caching video parts based on video partitions in at least one main original server,
player module implemented on a client device configured for checking validation data of expiration date of each video part and retrieving each video part from local or remote caching location based on validation of expiration date and generating video stream composed of all retrieved validated video parts.

9. The system of claim 8 wherein at least one video two parts have a different caching derivative with different validation information wherein generation module further configured for correlating logic segments with key frames, such that each logic segment is correlated with at least one key frame, wherein the key frame defines group of frames in compression scheme.

10. The system of claim 8 wherein the expiration dates for of video parts, are maintained on an external file associated to the multipart video.

11. The system of claim 8 wherein the expiration dates are maintained in a header of the streaming communication protocol of said multipart.

12. The system of claim 8 wherein the multipart video is personalized real time generate video, wherein the video generator module generates a video template comprising static elements and dynamic elements configured to be generated in real time based on personal or customized data received in real time, wherein the player module generates personal video based on video template including cache static video elements and dynamic video context elements and generating personalized elements which are unavailable in cache memory or retrieving elements which are available in cache memory of an original server or edge server.

13. The system of claim 12 wherein the caching static and dynamic video elements is based on usage statistics.

14. The system of claim 8 wherein the cache management module is implemented on the main original server.

15. The system of claim 8 wherein the cache management module is implemented on the client device.

16. The system of claim 8 wherein the cache management module is implemented on an edge server.

* * * * *